United States Patent [19]

Mahler et al.

[11] 3,741,616

[45] June 26, 1973

[54] BEARING, PARTICULARLY FOR VEHICLE SUN VISOR

[75] Inventors: Gert Mahler, Radevormwald; Wolfgang Meissner, Wengern, both of Germany

[73] Assignee: Gebr. Hoppich G.m.b.H., Wuppertal-Elberfeld, Germany

[22] Filed: Feb. 19, 1971

[21] Appl. No.: 116,826

[30] Foreign Application Priority Data
May 22, 1970  Germany .................. G 70 19 067.9

[52] U.S. Cl. .............................. 308/237, 296/97 R
[51] Int. Cl. ............................................ F16c 33/04
[58] Field of Search ...................... 308/237, 238, 36; 296/97 R, 97 K, 97 H

[56]  References Cited
 UNITED STATES PATENTS
3,666,336  5/1972  Leidy, Jr. ............................ 308/238
3,367,690  2/1968  Federspill ........................... 308/237
3,193,323  7/1965  Herr et al. ........................ 296/97 H
2,458,677  1/1949  Brundage .......................... 296/97 K
1,465,374  8/1923  Stetler .............................. 296/97 K FOREIGN PATENTS OR APPLICATIONS
543,330  12/1955  Belgium ............................ 308/237

*Primary Examiner*—Charles J. Myhre
*Attorney*—Ostrolenk, Faber, Gerb & Soffen

[57]  ABSTRACT

A bearing formed by folding a sheet to create a hollow, cylindrical shell, bearing body for receiving a bearing shaft and flaps extending beyond the bearing body, means extending over a short length of the bearing body for holding the flaps of the folded sheet together to impart resiliency to the bearing body; a plurality of spaced projections on diametrically opposed locations in the interior of the shell of the bearing body, for being engaged by the bearing shaft, and for causing the bearing body to flex outward and to press inward against the bearing shaft, thereby to resiliently brake the visor against undesired reorientation.

8 Claims, 3 Drawing Figures

PATENTED JUN 26 1973 3,741,616
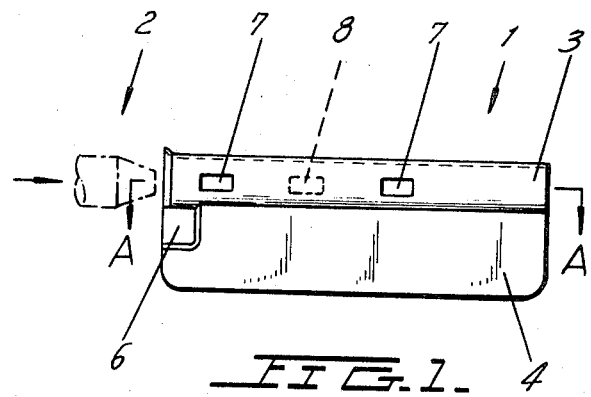
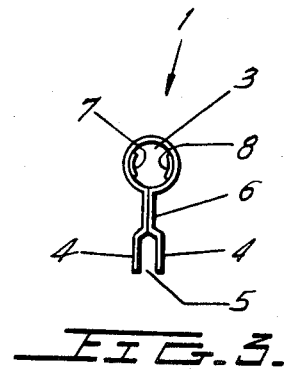
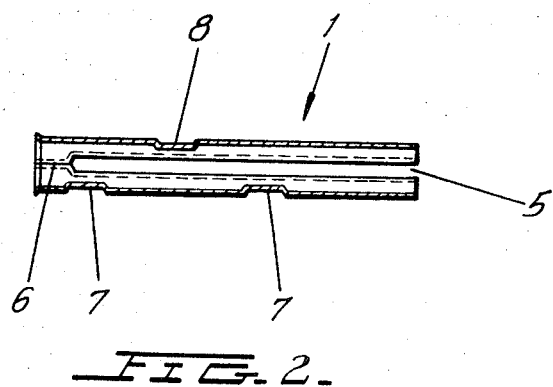
INVENTORS
GERT MAHLER
WOLFGANG MEISSNER
BY
Ostrolenk, Faber, Gerb & Soffen
ATTORNEYS

BEARING, PARTICULARLY FOR VEHICLE SUN VISOR

The invention relates to a bearing, which is particularly useful for sun visors in vehicles and which is comprised of a bearing body formed by bending a sheet to form a hollow, substantially cylindrical shell and of a bearing shaft received in the bearing body.

Normally, the bearing shaft for a bearing is held in a hollow shell body. A sun visor or the like object is secured to the bearing body. To firmly support the sun visor after it is manually adjusted to a desired angular position, it is necessary to design the bearing to brake the visor movement and exert a retaining force on the visor. The braking and retaining means is usually a spring construction connected with the bearing shaft and carried in the bearing body. The braking ability of this structure decreases after repeated movements of the visor. To counter this decrease, expensive means, such as an arrangement of several high quality springs or even an adjustable screw terminal, have been added. Therefore, such prior art designs require a compromise. Either an expensive construction is included or a reduction in braking ability is accepted.

It is the object of the invention to provide a bearing for sun visors and the like, which is simple to manufacture, reduces installation costs and substantially retains its desired braking ability for the duration of its intended use.

The bearing of the invention is comprised of a bearing body, which is formed by folding a length of sheet material to form a substantially cylindrical hollow shell bearing body for receiving a bearing shaft. During the folding, adjacent short length contact surfaces are formed in the flaps of the sheet material, which extend away from the bearing body. These adjacent contact surfaces define the minimum size of the opening in the bearing body by contacting one another. The bearing body is given resilience by securing these surfaces together, whereby insertion of the bearing shaft resiliently enlarges the opening in the bearing body.

Attached to the interior walls of the bearing body are a plurality of spaced apart projections, which are engaged by the bearing shaft as it is inserted into the bearing body. The bearing shaft presses outward on the projections and causes expansion of the resilient bearing body. The bearing body, in turn, presses inward on the bearing shaft and this brakes the bearing body against rotation with respect to the bearing shaft.

A further understanding of the invention will be obtained from the following description of the accompanying drawings, showing one embodiment of the present invention, in which:

FIG. 1 is a side view of a visor bearing designed in accordance with the present invention;

FIG. 2 is a cross-sectional view along the line and in the direction of arrows A-A of FIG. 1; and FIG. 3 is a view from the right of FIG. 1.

Turning to the drawings, bearing 1 is formed by folding a sheet of material, such as a metal like steel, to create a generally cylindrical hollow shell 3 surrounding and defining an opening. The shell is the bearing body for receiving bearing shaft 2, described below. Beneath bearing body 3, the flaps 4 of the folded sheet are spaced a distance apart, which defines the gap 5. However, each flap has a small area of contact, which is defined by integral indentation 6 formed in the flap. Both indentations 6 are approximately the same depth. FIGS. 2 and 3 show the design of the bottom of each indentation 6.

Using two opposed indentations integrally formed in the flaps to provide the areas of contact simplifies the manufacture of the bearing and permits the use of reasonably priced materials. Engagement of the contact areas of the flaps at the indentations defines the minimum width or diameter of bearing body 3.

Further benefits are obtained if flaps 4 are connected to each other at their contact areas, e.g. by welding, riveting and the like. A connection in the precisely preselected area of the indentations may be made by an assembler without regard to the location of the connection along the length of the bearing body and flap, and thus is a simple operation. Complex measurements are not necessary.

It is particularly advantageous when indentations 6 are located at one end of bearing body 3. The unsecured springy, flexible area of body 3 has a longer length and thus has a more favorable effect than a shorter flexible area would have. In the illustrated embodiment, indentations 6 are at the end of bearing body 3 at which bearing shaft 2 enters the body. This stabilizes the bearing during assembly, particularly against bending of the bearing shaft.

Bearing body 3 has a cross-sectional interior diameter, which exceeds the exterior diameter of the bearing shaft 2. Shaft 2 is an elongated cylinder having an exterior diameter less than the interior diameter of bearing body 3. The diameter of shaft 2 is slightly larger than the linear distance between the apices of the oppositely disposed projections 7 and 8, described below, thereby to ensure braking of the visor. Shaft 2 is tapered at its forward end for easier insertion.

Disposed on the interior wall surface of bearing body 3 are a plurality of projections 7, 8, which engage the surface of bearing shaft 2 when it is inserted. These are the only elements which contact the bearing shaft. Although the linear distance between the apices of oppositely disposed projections is smaller than the exterior diameter of bearing shaft 2, because the areas of contact of indentations 6 are offset from projections 7, 8, the flexibility of the material of bearing body 3 permits the insertion of shaft 2, which results in a corresponding widening of bearing body 3 that is taken up by the gap 5. The extent of widening and the resiliency of the bearing body 3 is controlled by the connection between indentations 6.

Projections 7, 8 are arranged relative to each other along diametrically opposite interior wall locations in bearing body 3. On one side, there are two projections 7, which are widely spaced apart and each of which is located near one of the ends of bearing body 3. On the other side of the bearing body, there is a single projection 8, which is located near the middle of bearing body 3. This results in a small surface, three point contact between bearing body 3 and bearing shaft 2. Such small surfaced contact favorably affects the braking ability of the visor in relation to the duration of its use and helps to ensure evenness of braking. The positions of projections 7, 8 result in a stress on bearing shaft 2 in the direction of a steady deflection, whereby the visor will not undesirably rotate and will be properly braked.

Furthermore, material abraded from bearing shaft 2 or possible dirt in bearing body 3 freely travels through bearing body 3 laterally of projections 7, 8 and can readily escape through opening 5, so that the visor braking ability is not adversely affected by such impurities.

Projections 7, 8 can readily be formed in the bearing body during the folding operation which forms the bearing body, thereby reducing manufacturing costs.

With the construction of the invention, an improved bearing, for use in sun visors and the like, is provided with effective braking ability of long duration.

Although the present invention has been described in connection with a preferred embodiment thereof, many variations and modifications will now become apparent to those skilled in the art. It is preferred, therefore, that the present invention be limited not by the specific disclosure therein, but only by the appended claims.

1. In a bearing including a bearing body comprised of a wall surrounding and defining a hollow opening; said wall having ends at the ends of said hollow opening; and said bearing also including a bearing shaft inserted in said hollow opening, the improvement comprising, said wall having a plurality of locations at various positions around said wall and each extending the length of said wall;

a plurality of short length projections spaced apart from each other along said wall, spaced inwardly from said wall ends, extending lengthwise along said wall in a direction between said ends and said projections projecting from said wall into the hollow engaging the inserted said bearing shaft, thereby to brake relative rotation between said bearing body and said bearing shaft, along one said lengthwise wall location, said wall having two said projections spaced apart from each other; along another said wall location, said wall having one projection located to be spaced between the two said projections.

2. In the bearing of claim 1, wherein said bearing body wall defines a hollow opening of substantially cylindrical cross-section, the improvement further comprising, said wall locations for said projections being disposed along two diametrically opposed locations on said wall of said bearing body.

3. In the bearing of claim 2, the improvement further comprising, along the said wall location having two said projections, each of these said projections is located near one of the ends of said bearing body and along the other opposite said wall location, the single said projection is located near the middle of said bearing body.

4. In the bearing including a bearing body comprised of a wall surrounding a hollow opening and including a bearing shaft insertable in the hollow opening, the improvement comprising, a plurality of projections extending from said wall into the hollow opening for engaging the inserted said bearing shaft, thereby to brake relative rotation between said bearing body and said bearing shaft, said bearing body being formed of a folded sheet of material such that the bearing body is formed centrally of the sheet of material, and neighboring parallel flaps of the sheet material of said bearing body are formed to extend away from said bearing body; said flaps being at a distance from each other;

each of said flaps including a respective contact area which occupies a relatively small portion of its surface area; said contact areas being in engagement with each other, thereby to define the minimum width of said hollow opening in said bearing body.

5. In the bearing of claim 4, the improvement further comprising, said contact areas being defined by a respective indentation integrally formed in each of said flaps; each of said indentations being at substantially the same depth.

6. In the bearing of claim 5, the improvement further comprising, said contact areas being secured together.

7. In the bearing of claim 4, the improvement further comprising, said contact areas being disposed near one of said ends of said wall.

8. In the bearing of claim 7, the improvement further comprising, said bearing shaft being insertable into said bearing body at one end thereof and said contact areas being located near that said end thereof.

* * * * *